United States Patent [19]
Parulski et al.

[11] Patent Number: 5,406,325
[45] Date of Patent: Apr. 11, 1995

[54] METHOD AND APPARATUS FOR FORMING A SOURCE-INDEPENDENT IMAGE DATA METRIC FROM SECOND GENERATION PHOTOGRAPHIC FILMS

[75] Inventors: Kenneth A. Parulski, Rochester; Stephen E. Johnson, Pittsford; Donald C. Bellis, Jr., Rochester, all of N.Y.

[73] Assignee: Eastman Kodak Company, Rochester, N.Y.

[21] Appl. No.: 909,279

[22] Filed: Jul. 6, 1992

[51] Int. Cl.⁶ ............... H04N 1/46; H04N 3/36; H04N 9/11; G03B 27/32
[52] U.S. Cl. ............... 348/97; 355/77; 355/133
[58] Field of Search ............... 358/76, 75, 54, 214, 358/505, 527; 355/77, 133; H04N 9/11, 3/36, 3/38, 3/40, 5/253; 348/97

[56] References Cited

U.S. PATENT DOCUMENTS

| | | | |
|---|---|---|---|
| 4,166,701 | 9/1979 | Miller | 355/32 |
| 4,970,584 | 11/1990 | Sato et al. | 358/75 |
| 5,223,891 | 6/1993 | Fierstein et al. | 355/77 |

FOREIGN PATENT DOCUMENTS

| | | | |
|---|---|---|---|
| WO91/02427 | 2/1991 | WIPO | H04N 1/46 |
| WO91/10316 | 7/1991 | WIPO | H04N 1/46 |
| WO92/15957 | 9/1992 | WIPO | G06F 15/62 |

Primary Examiner—James J. Groody
Assistant Examiner—Cheryl Cohen
Attorney, Agent, or Firm—David M. Woods

[57] ABSTRACT

A technique for improving the tone and color reproduction of print and slide images which are photographed onto color negative film, scanned by a Photo CD negative scanner and transferred onto Photo CD discs is disclosed. The technique incorporates a calibration method for (1) producing color negatives (or slides) using normal scanner calibration targets, (2) producing controlled prints from the negatives, (3) re-photographing the prints (or slides) onto a second color negative film, and (4) performing the normal scanner calibration using this second "cascaded" film. The calibration step not only "compensates for" the second color negative film (as is the case when calibrating for "normal" film exposed from the original scenes) but also "compensates for" the first negative film "print through" (or slide) characteristics. This means that the image data recorded on the Photo CD disc will more closely resemble the data which would be produced if the original scene had been photographed on color negative film and scanned directly.

11 Claims, 13 Drawing Sheets

METHOD AND APPARATUS FOR FORMING A SOURCE-INDEPENDENT IMAGE DATA METRIC FROM SECOND GENERATION PHOTOGRAPHIC FILMS

CROSS REFERENCE TO A RELATED APPLICATION

Reference is hereby made to U.S. patent application Ser. No. 455,541 filed on Dec. 22, 1989, now abandoned in the name of E. J. Giorgianni et al. and entitled METHODS AND ASSOCIATED APPARATUS FOR FORMING IMAGE DATA METRICS WHICH ACHIEVE MEDIA COMPATABILITY FOR SUBSEQUENT IMAGING APPLICATIONS.

BACKGROUND OF THE INVENTION

1. Field of the Invention

The present invention is related to the field of digital image processing and more particularly to a method and associated apparatus for improving the tone and color reproduction of print and slide images which are photographed onto color negative film, scanned by a negative scanner and transferred onto Photo Compact Disc (hereinafter referred to as Photo CD).

2. Description of Related Art

Figure 1:
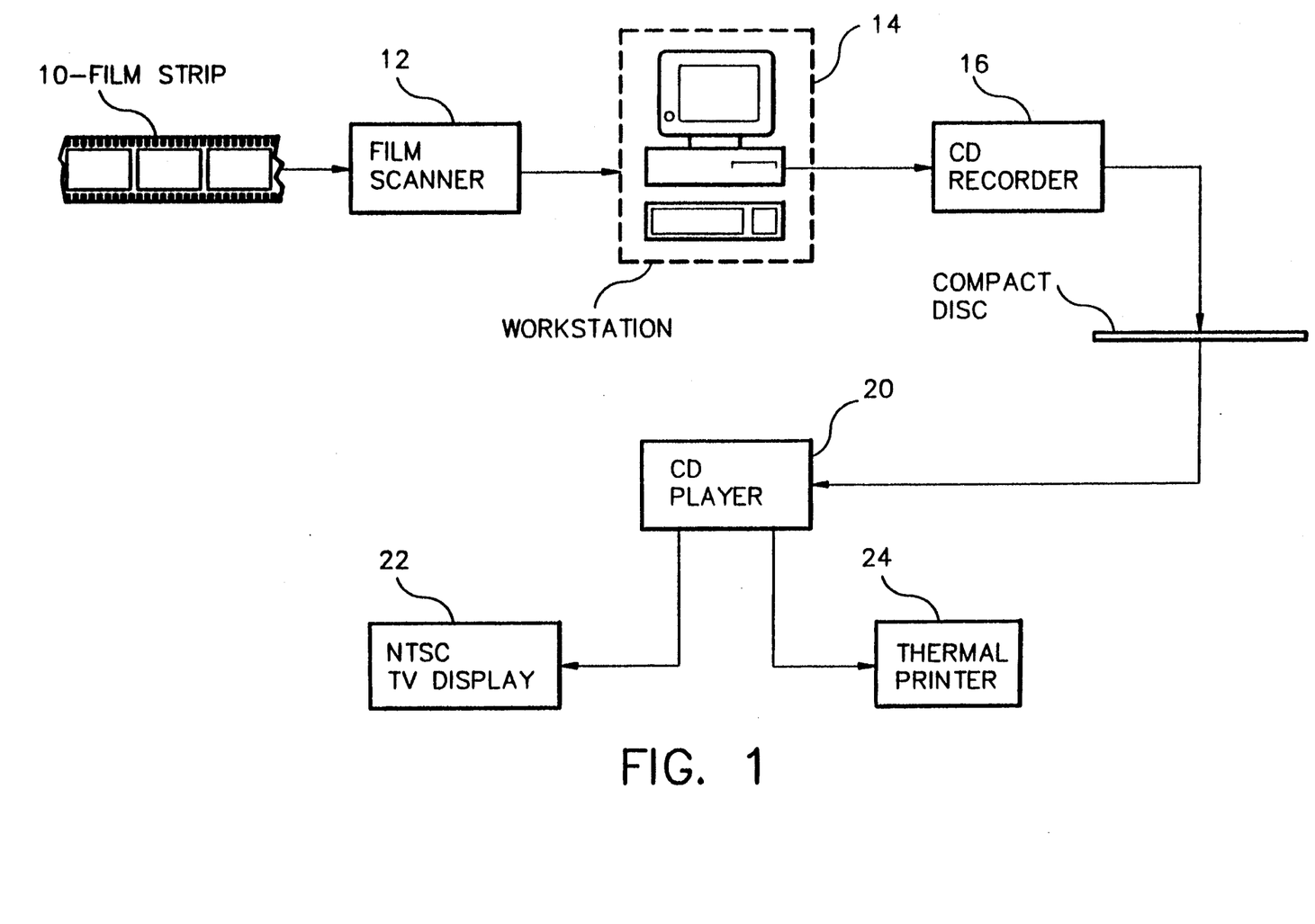
FIG. 1 illustrates an apparatus on which the present method may be implemented.

Eastman Kodak Co., the assignee of the present invention, has been developing a "Photo CD" system that is illustrated in block form in FIG. 1. The system uses a film scanner 12 to scan 35 mm photographic film strips 10. The film scanner 12 converts sensed light, generally analog in nature, into digital signals and forwards these signals to a computer workstation 14. These digital image signals are processed and stored or passed directly to a CD recorder (writer) 16 by the operation of the workstation 14. The writer causes the digitized image data to be recorded on a write-once compact disc. A CD player 20 is used to read the disc and to generate electrical signals for driving a TV display 22 or a hard copy printer, such as a thermal printer 24.

Some potential consumer and industrial Photo CD users will be interested in scanning photographic prints, hardcopy documents, or slides, rather than 35 mm film. The Photo CD system is designed so that the outputs from color negative film scanners, color transparency (slide) film scanners, and reflection (print) scanners are all converted to a common image data metric. The conversion technique is described in the cross-referenced patent application entitled "Methods and Associated Apparatus for Forming Image Data Metrics Which Achieve Media Compatibility for Subsequent Imaging Applications" by Giorgianni et al.

Figure 2A:
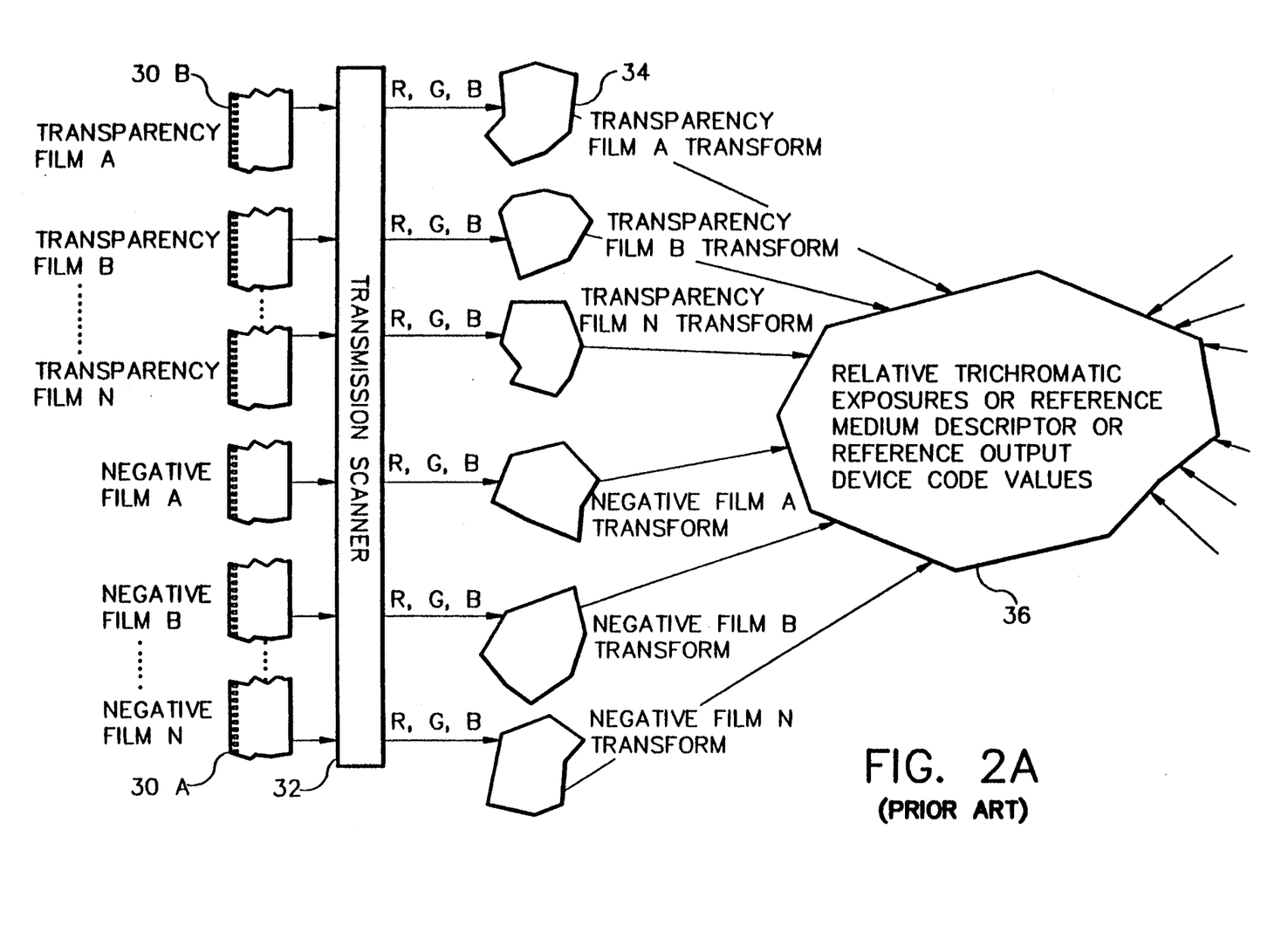
FIGS. 2A and 2B illustrate the PRIOR ART, in block diagram form, for transforming R,G,B, signal values from a plurality of different input sources to a common data metric.
Figure 2B:
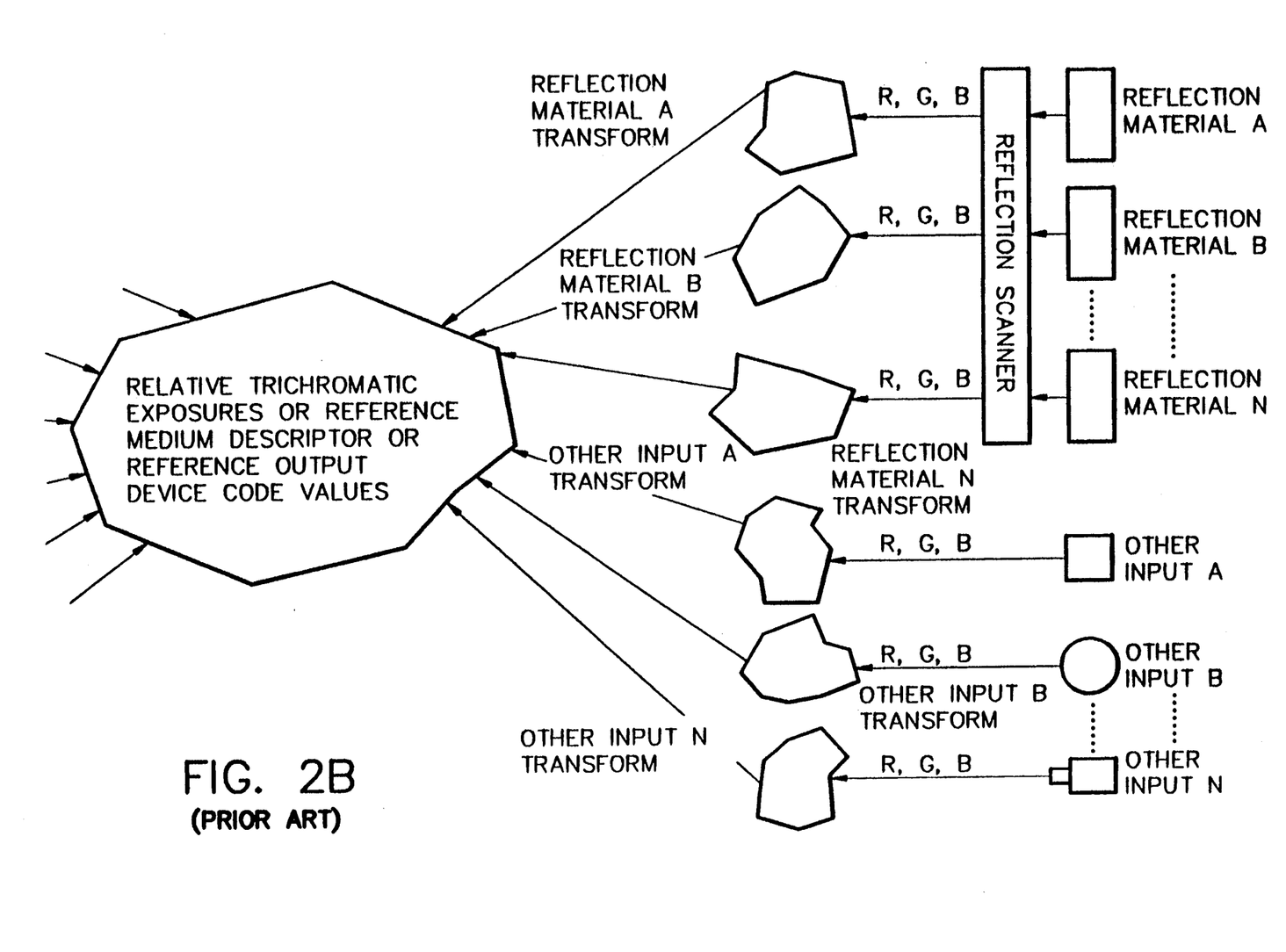

FIGS. 2A and 2B illustrate conversions from various inputs to a common data metric. In the conversion shown the input signals are all R,G,B image bearing signals produced, for example, by scanning an image from a negative or transparency film 30A and 30B, respectively, with a transmission scanner 32, and transforming by transforms 34 the formed R,G,B signals to an image manipulation or storage metric 36 approximating the relative trichromatic exposure values that each input film received when it captured the original image. In a like manner reference medium descriptors and reference output device code values may also be used.

Figure 3:
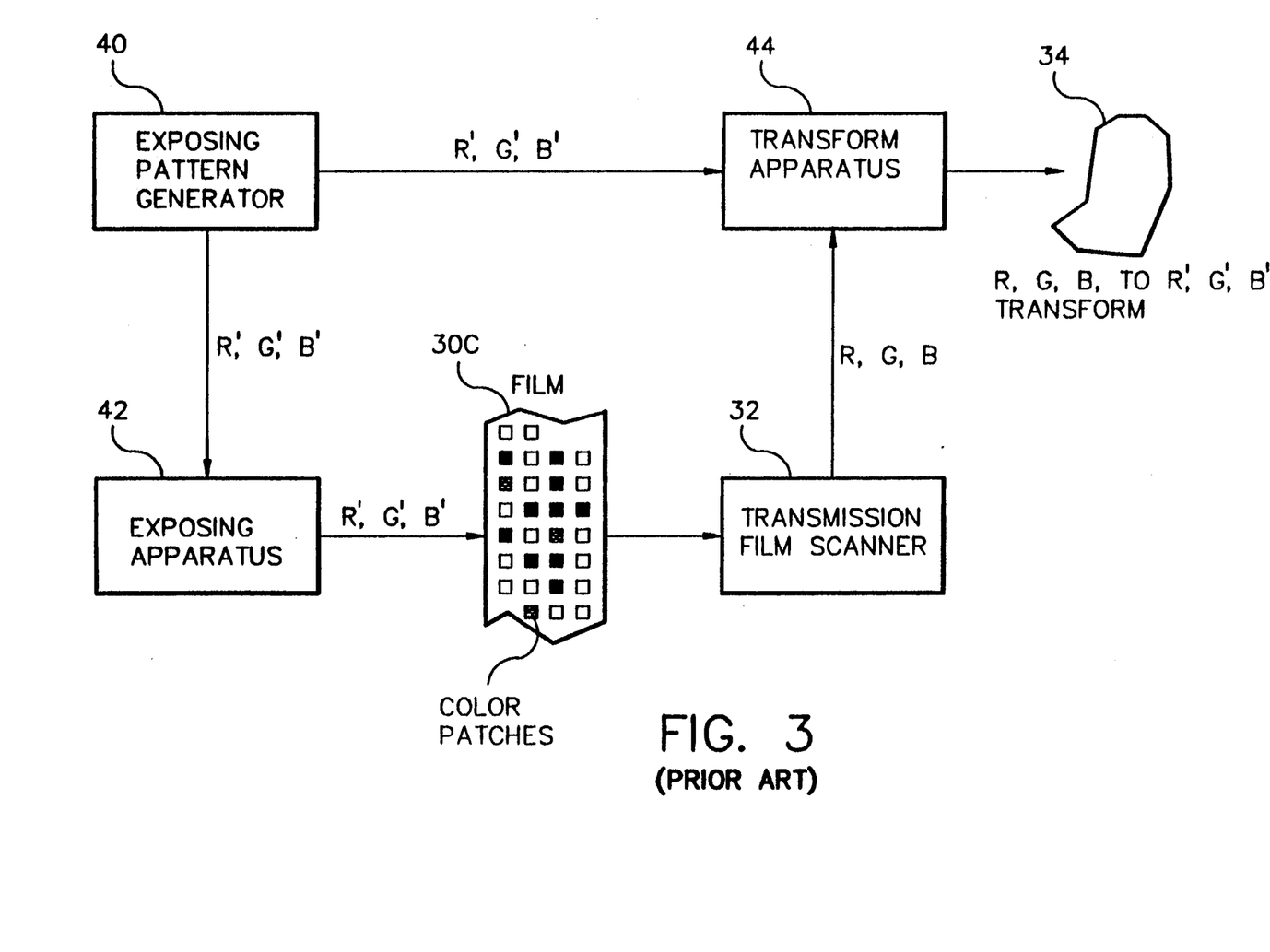
FIG. 3 illustrates the PRIOR ART, in block diagram form, for calibrating a transform apparatus using generated color patches.

In FIG. 3 color patches (exposure patterns), chosen to adequately sample and cover the useful exposure range of the film being calibrated, are created by an exposing character generator 40 generating signals that are fed to an exposing apparatus 42. The exposing apparatus 42 produces known trichromatic exposures on the film 30C to create test images consisting of approximately 400 color patches. The test images may be created by using a variety of methods appropriate for the application. These methods include, but are not limited to, exposing using an exposing apparatus such as a sensitometer, using the output device of a color imaging apparatus, or using test objects of known reflectances illuminated by known light sources and calculating trichromatic exposure values. If input films of different speeds are used, the overall red, green and blue exposures must be properly adjusted for each film in order to compensate for the relative speed differences between the films. Thus, each film receives equivalent exposures, appropriate for its red, green, and blue speeds. Exposed film is processed chemically and the film patches are read by the transmission scanner 32 which produces the R,G,B image bearing signals corresponding to each color patch. A transform apparatus 44 creates a transform 34 relating the R,G,B image bearing signal values for the film's test colors to the known R',G',B' exposures of the corresponding test colors.

Figure 4A:
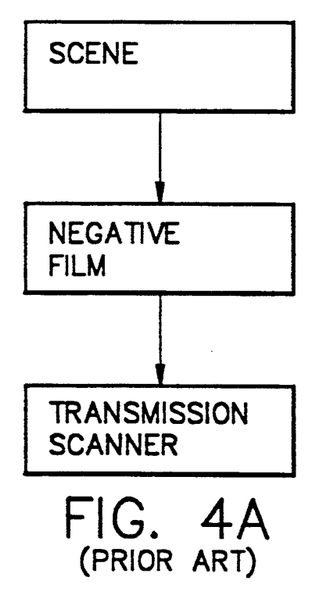
FIGS. 4A through 4C illustrate, in flow chart form, the PRIOR ART steps for providing a representation of an original scene to a transmission scanner via negative film or slide film, or to a reflection scanner via a photographic print, respectively.
Figure 4B:
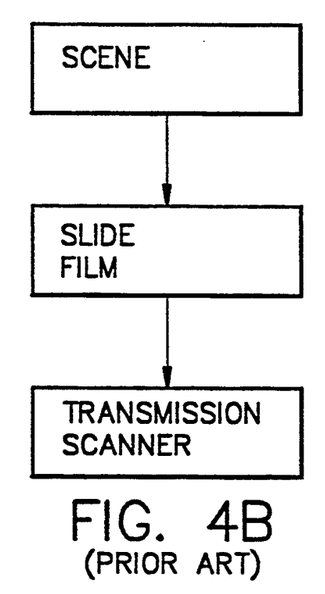
Figure 4C:
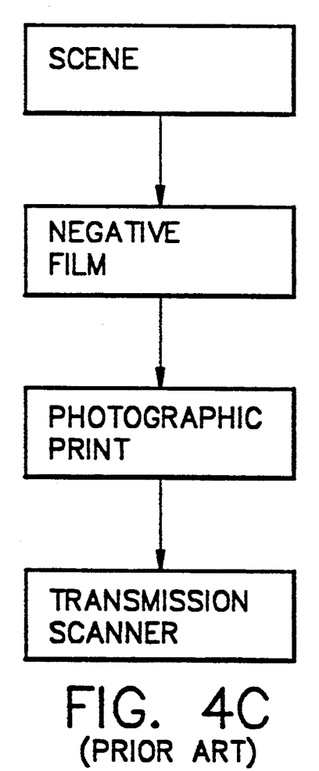

FIGS. 4A, 4B and 4C are simplified flowcharts of the methodologies described in the Giorgianni et al patent, showing how the original scene is photographed onto negative film or slide film, and how the film, or a print made from the film, is scanned. Note that each of the three flowcharts includes only one film step.

Some Photo CD customers having prints or slides to scan may find it impossible or inconvenient to directly scan their original images. For example, print or slide scanners may not be as readily available as negative scanners. They may therefore chose to rephotograph their prints or slides onto color negative film, and have the developed "duplicate" or "cascaded" film images scanned. The inventors of the present invention have recognized that if the Photo CD scanner is calibrated using only the methods described in the Giorgianni et al application, the result will be images with lower color saturation and higher contrast than desired. This occurs because the prior art calibration techniques are not designed to correct for the "cascading" of two photographic stages, but instead correct only for the second stage. Since the first photographic stage has a non-unity gamma as described in an article by Hunt, R. W. G. et. al, entitled "The Tone Reproduction of Colour Photographic Materials", Journal of Photographic Science, Vol 17, 1969, pp. 198–204, and a different (usually reduced) relative metric chroma compared to the scene, the tone and color reproduction from these applications employing two "cascaded" film steps will be very different from the tone and color reproduction of the applications utilizing only a single film step. What is needed is a method for improved correction of the tone and color reproduction of "cascaded" negative film images photographed from prints or slides, in order to provide improved picture quality.

SUMMARY OF THE INVENTION

The present invention incorporates a calibration method of (1) producing color negatives (or slides) using normal scanner calibration targets, (2) producing controlled prints from the negatives, (3) rephotographing the prints (or slides) onto a second color negative film, or color reversal (slide) film and (4) performing the normal scanner calibration using this second "cascaded" film. The calibration step not only compensates for the second color negative or color reversal film (as is the case when calibrating for "normal" film exposed from the original scenes) but also compensates for the first negative film "print through" (or slide) characteristics. This means that the image data recorded on the Photo CD disc will more closely resemble the data which would be produced if the original scene had been photographed on color negative film or color reversal film and scanned directly. During normal scanner operation, the operator can select from the "film type" menu options not only the "normal" film types (Gold 100 TM, Ektachrome 100 TM, etc.), but also "cascaded" film options, for example color prints cascaded onto Gold 100 TM film. The appropriate matrices and look-up tables for the selected "cascaded" mode are loaded into the scanner. In addition, the scene color balance algorithms can be "locked" to a copy film frame exposure from a gray (neutral) test target during the scanning, and edge enhancement filter coefficients can be set to compensate for the additional MTF loss from the "cascaded" photographic stages.

Accordingly, it is a primary object of the present invention to provide a technique for improving the tone and color reproduction of print and slide images which are photographed onto color negative film or color reversal film.

It is another object of the present invention to form an image data metric from a scanned and transformed color negative film or color reversal film of a print or slide.

It is a further object of the present invention to provide a transform of an image data metric that is calibrated from exposure patterns representing the range of exposure of the original scene for use in a second generation film from a print or slide.

These and other objects of the present invention will become more apparent when taken in conjunction with the following description and drawings, wherein like characters indicate like parts and which drawings form a part of the present description.

DESCRIPTION OF THE PREFERRED EMBODIMENTS

Figures 5A, 5B:
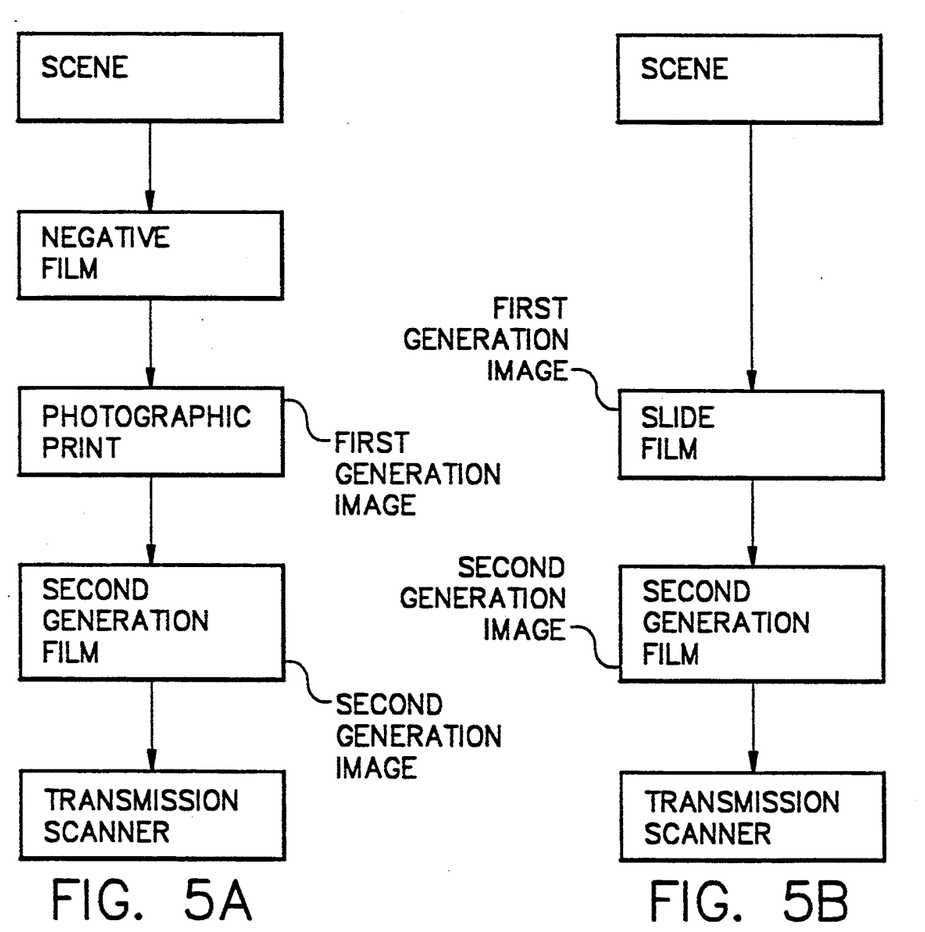
FIGS. 5A and 5B illustrate, in flow chart form, the steps of generating an image from a second generation negative film or reversal film from a photographic print and a slide, respectively.

The cascading of photographic stages is shown in FIG. 5A for prints photographed onto color negative film, and in FIG. 5B for slides photographed onto color negative or reversal film. It should be understood that in many cases it may be impractical to determine which films were used to produce the original prints or slides. Therefore, in performing the calibrations of the invention, an "aim" negative film and paper system characteristic, instant print film system characteristic, or reversal (slide) film system characteristic must be chosen.

Figure 6A:
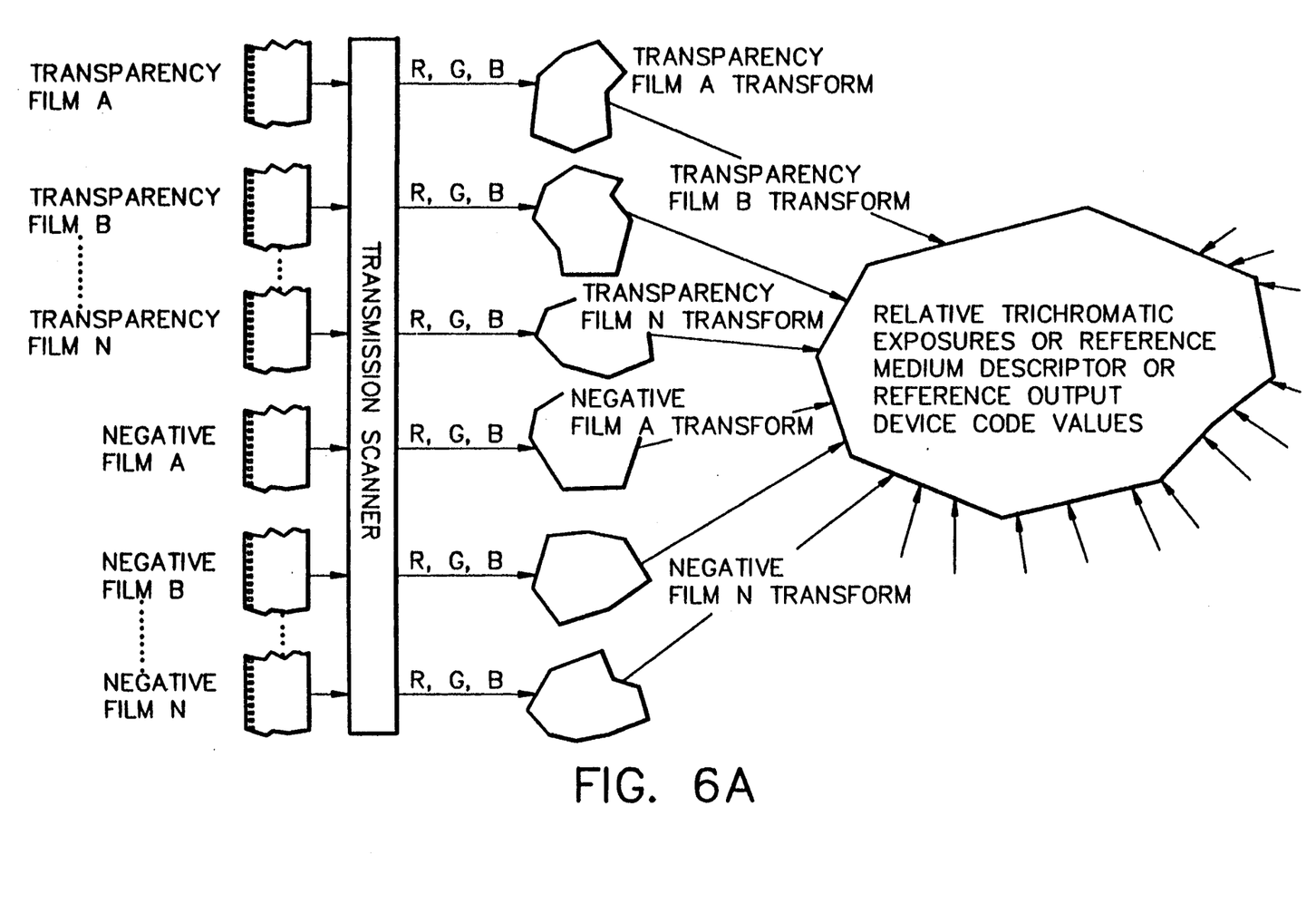
FIGS. 6A, 6B and 6C illustrate the processing of original images captured on a variety of media by the formation of a second generation film that is scanned and the results transformed to an image metric.
Figure 6B:
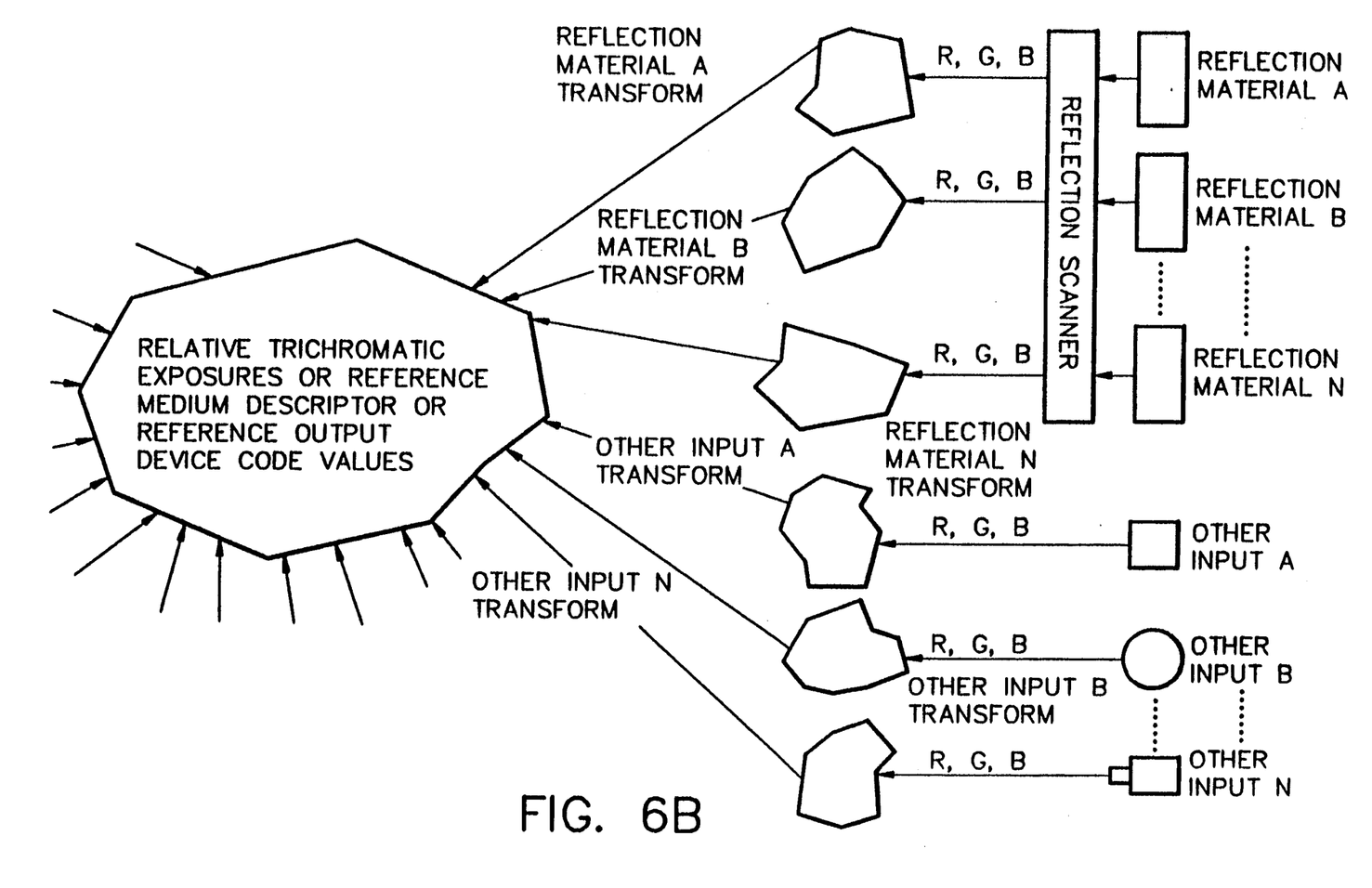
Figure 6C:
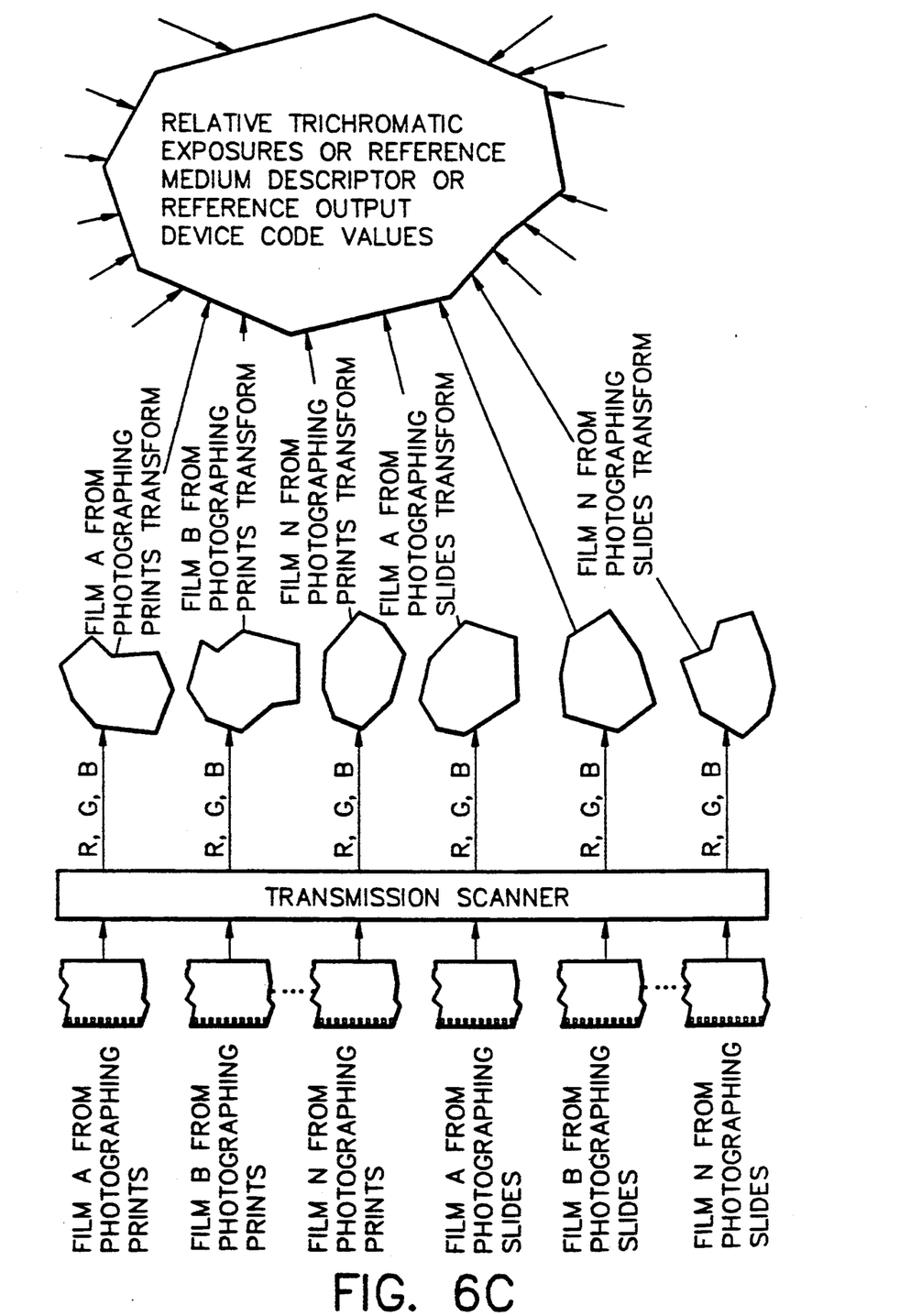

FIGS. 6A, 6B and 6C illustrate how the "PRIOR ART" conversion method of FIGS. 2A and 2B have been expanded to include as inputs "cascaded" negative or reversal films from photographing prints, and "cascaded" negative films from photographing slides. Note that each of the N films from photographing prints do not necessarily refer only to different types of film corresponding to the second film steps in FIG. 5A, but may also refer to different types of photographic prints, for example a different calibration may be used for black and white prints, or for instant prints, than for color prints from conventional color negative films. Likewise, each of the N films from photographing slides do not necessarily refer to different types of film corresponding to the second film (second) stage in FIG. 5B, but may also refer to different types of slide film. In the situations just described, the person performing the scanning must know what type of print (i.e. conventional or instant) or what type of slide film (i.e. Ektachrome or Kodachrome) was used. One way to enable this to occur is to photograph onto the second stage film a grey card which includes a designation as to what type of print or slide film was photographed onto the second stage film. The grey card can also be used, if desired, to set the color balance for all of the slides or prints to be transferred.

Figure 7:
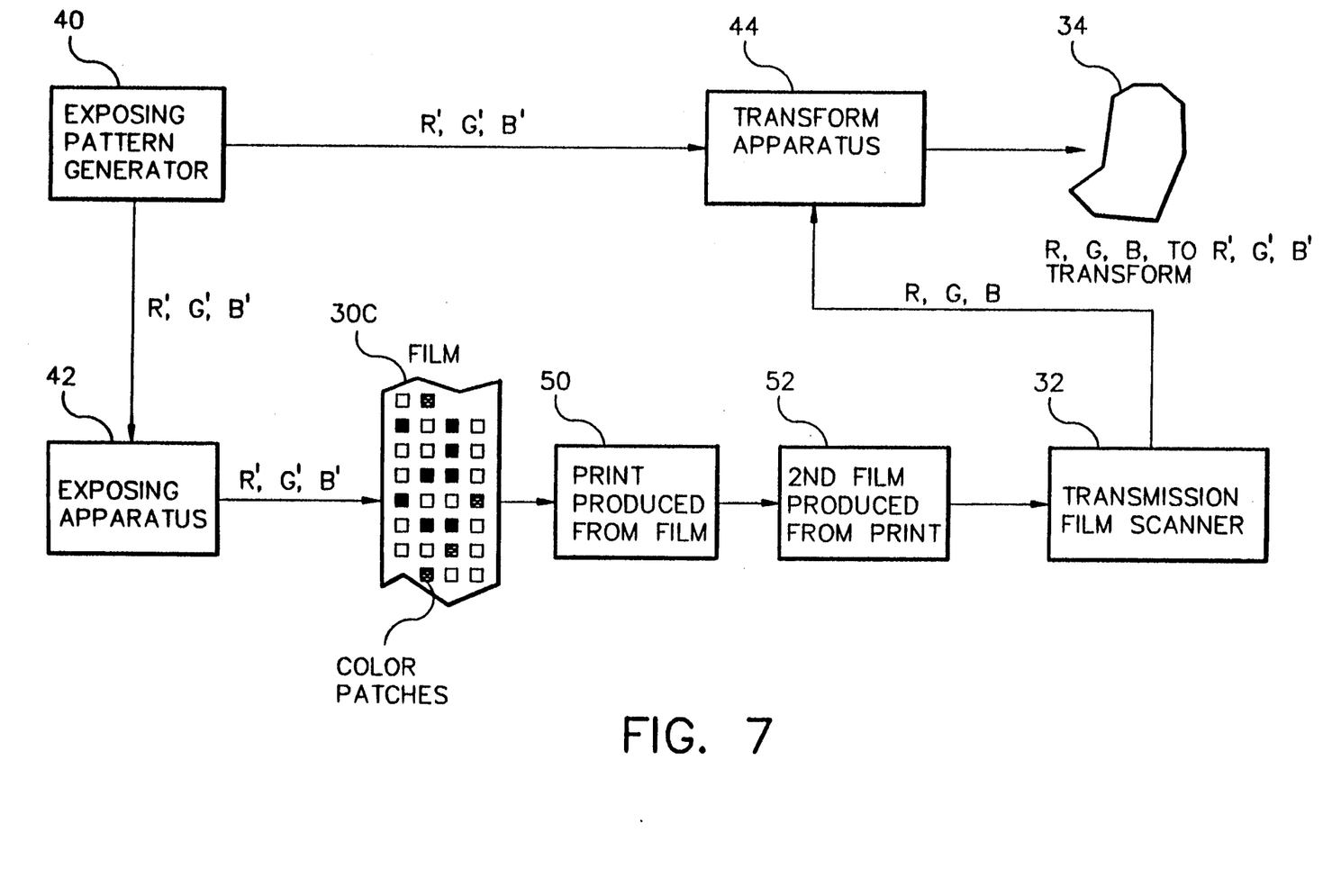
FIG. 7 illustrates, in block diagram form, the generation of calibration signals that are used to form the transforms of the present invention in print processing.

FIG. 7 illustrates a calibration technique for "cascaded" second generation film produced by photographing prints. In this operation the color patches on the film 30C are printed on hard copy 50 and the print is then photographed to produce the second film 52. The second film 52 is then scanned by the transmission scanner 32. The output from the transform apparatus 44 will then be the desired transform 34 for the situation of generating a second film from a print. Note that the film color patches described in the Giorgianni et al application are printed, and the print is re-photographed and scanned.

Figure 8:
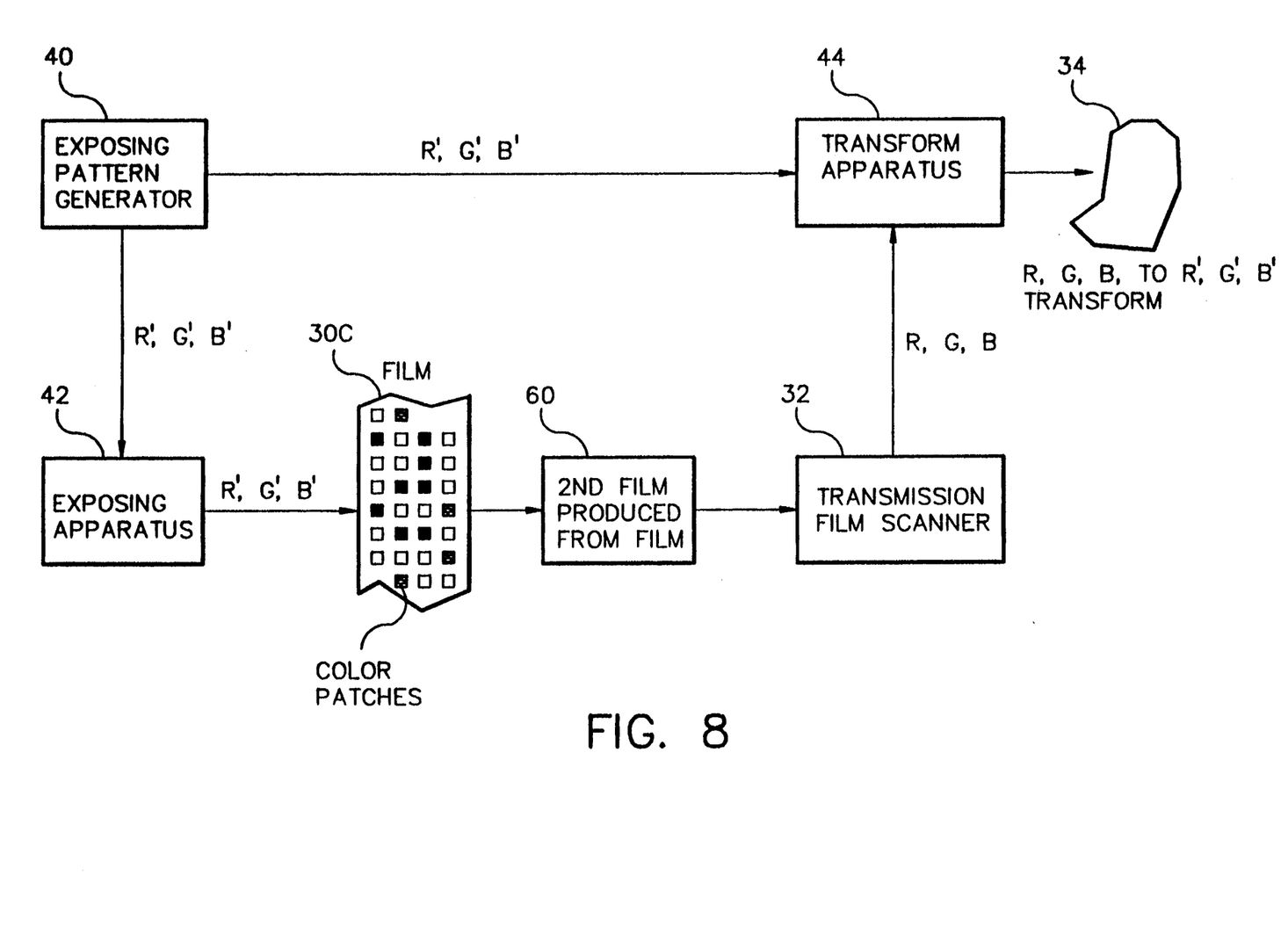
FIG. 8 illustrates, in block diagram form, the generation of calibration signals that are used to form the transforms of the present invention in slide processing.

FIG. 8 illustrates the calibration technique for "cascaded" second generation film produced by photographing slides. In this situation, the slide color patches 30C are re-photographed to produce the second film 60 which is then scanned. Note that these new calibration procedures compensate not only for the second film stage, but also compensate for the first "negative-to-print" or "slide film" stage.

Figure 9:
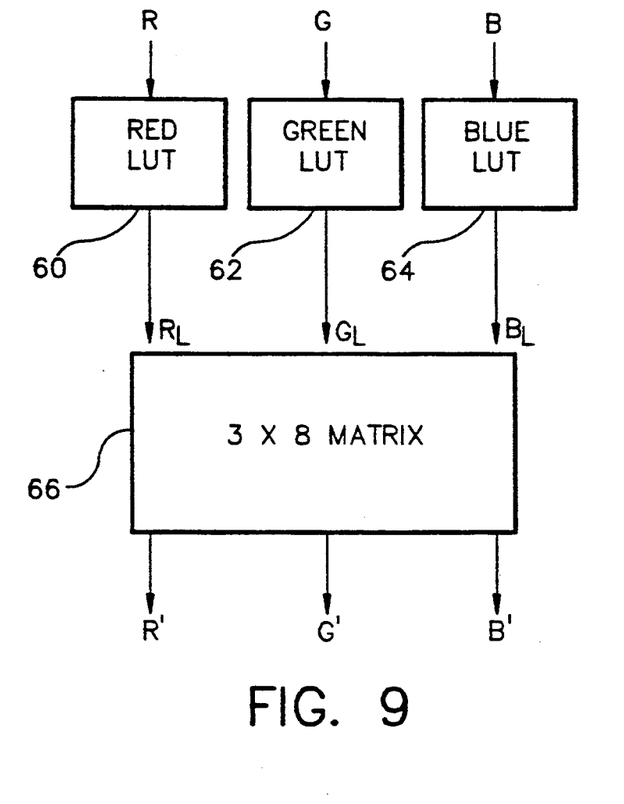
FIG. 9 illustrates, in block diagram form, one Embodiement of an RGB to R'G'B' transform 34 in FIG. 7.
Figure 10:
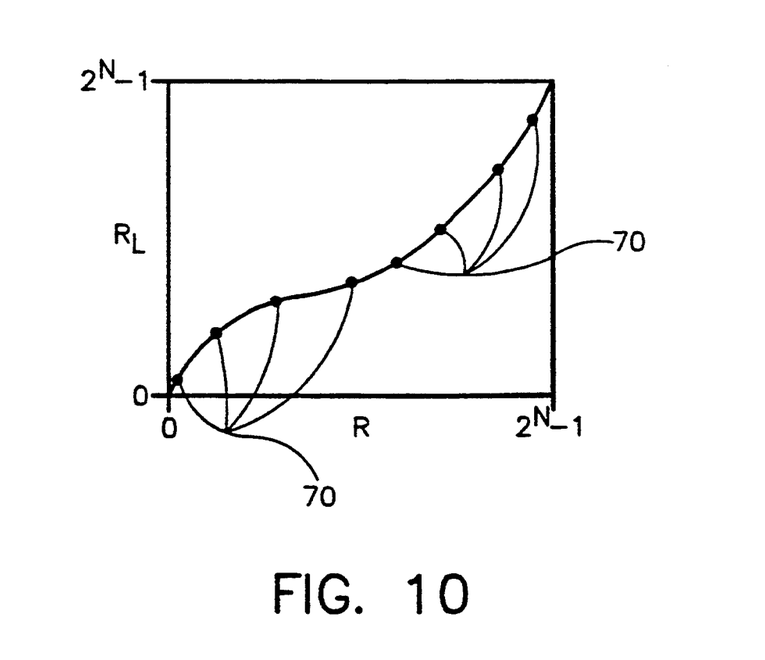
FIG. 10 illustrates one possible curveshape for the red lookup table 60 in FIG. 9.

FIG. 9 illustrates in block diagram form one possible RGB to R'G'B' transform 34 which could be computed by transform apparatus 44. The R (red) signal is input to red lookup table (LUT) 60, the G (green) signal is input to green lookup table (LUT) 62, and the B (blue) signal is input to blue lookup table (LUT) 64. FIG. 10 illustrates one possible lookup table curveshape for red lookup table 60, where the horizontal axis is the input code value R, and the vertical axis is the lookup table output value $R_L$. The maximum input code value is equal to $2^N-1$, where N is the number of bits in the input code word, for example N=8 for input values from 0 to 255. The green and blue lookup table would have a similar form. The actual lookup table curveshape values are computed during scanner calibration using the neutral test patch values.

The outputs of LUTs 60–64 in FIG. 9 are input to a 3×8 matrix 66. The outputs of the matrix are equal to the transform output values R', G', and B'. The output values R', G', and B' from matrix 66 are given by the equations:

$$R'=a_1+a_2R_L+a_3G_L+a_4B_L+a_5R_L^2+a_6R_LG_L+a_7R_LB_L+a_8G_LB_L$$

$$G'=b_1+b_2R_L+b_3G_L+b_4B_L+b_5R_L^2+b_6R_LG_L+b_7R_LB_L+b_8G_LB_L$$

$$B'=c_1+c_2R_L+c_3G_L+c_4B_L+c_5R_L^2+c_6R_LG_L+c_7R_LB_L+c_8G_LB_L$$

where $a_1-a_8, b_1-b_8$, and $c_1-c_8$ are coefficient values computed during scanner calibration using the color test patch values.

Figure 11:
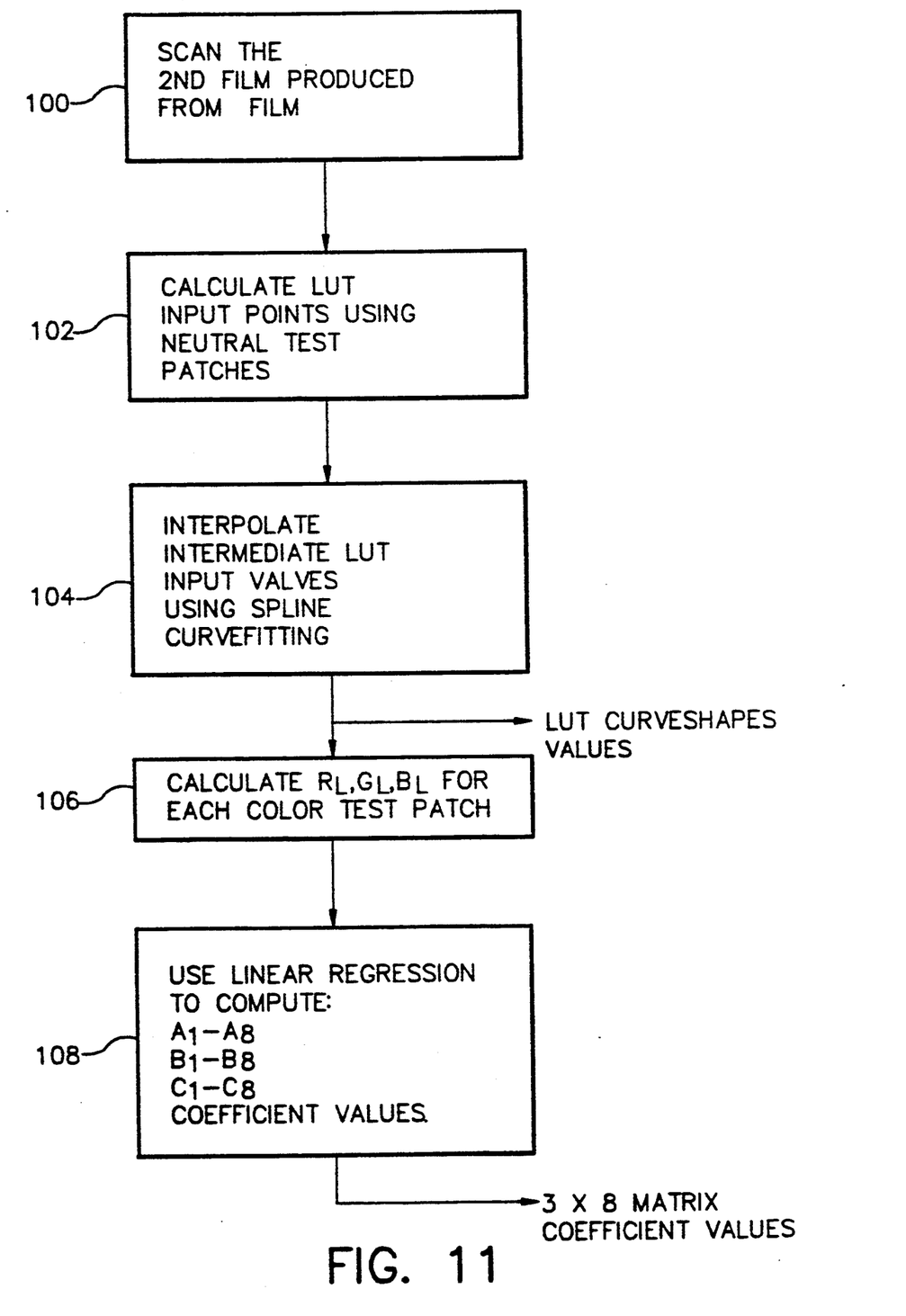
FIG. 11 illustrates, in flow chart form, the calculates performed in transform apparatus FIG. 7.

FIG. 11 is a flow chart illustrating the computations performed in transform apparatus 44 in FIG. 7, in order to obtain the proper transform for each "cascaded" film option listed in FIG. 6, for example prints cascaded onto Gold 100 film ™. The first step 100 is to scan the second generation film 52 which includes a test exposure pattern from the exposing apparatus 42. The RGB values output by the transmission film scanner 32 when scanning film 52 include values from two types of patches, neutral patches (dark grey, light grey, etc.) and non-neutral patches (deep red, light green, etc.). Only the neutral patches are used in steps 102–104, to provide a lookup table curveshape of the form shown in FIG. 10.

Each large dot 70 in FIG. 10 represents one neutral patch, where $R_L$ equals the R' value from the transmission scanner 32 for that same neutral patch. In step 102, the input values for the dots 70 are used to define the basic curveshape. In step 104, curveshape values for input values between dots 70 are calculated using spline curvefitting techniques which are well known in the art.

The result of step 104 is the lookup table curveshapes for LUTs 60–64 in FIG. 9. These LUTs are then used to provide $R_L$, $G_L$, and $B_L$ values for each of the color test patch RGB values from scanner 32. The values for matrix coefficients $a_1-a_8, b_1-b_8$, and $c_1-c_8$ are then computed using standard linear regression techniques to minimize the error between the matrix value outputs and the R'G'B values used in exposing apparatus 42 for each of the color patches. The matrix coefficients now provide the transformed R'G' and B' values from the $R_L$, $G_L$, and $B_L$ value outputs from lookup table 60–64.

It is understood that the other forms of the transformation between scanner R,G,B, and R'G'B' can be used in place of the scheme described above within the scope of this invention.

Because the two applications shown in FIG. 5 involve 2 film stages, both of which utilize lenses, the modulation transfer function (MTF) of the scanned film will typically be substantially poorer than the MTFs obtained by directly scanning the films or prints as shown in FIG. 4. The inventors of the present invention have recognized that it is therefore beneficial to increase the level of edge enhancement performed by workstation 14 of FIG. 1 as part of the image processing steps which follow the film scanning and precede the writing of the digital images to CD disc. The level of edge enhancement can be increased, for example, by altering the lookup table shown in U.S. Pat. No. 4,962,419 "Detail Processing method and apparatus providing uniform processing of horizontal and vertical detail components" by Hibband, et. al., assigned to the assignee of the present invention and incorporated by reference herein.

During normal scanner operation, the operator can select from the "film type" menu options not only the "normal" film types (Gold 100 ™, Ektachrome 100 ™, etc.), but also "cascaded" film options, for example color prints cascaded onto Gold 100 ™ or Ektachrome 100 ™ film. The appropriate matrices and look-up tables for the selected "cascaded" mode are loaded into the scanner. In addition, the scene color balance algorithms can be "locked" during the scanning to use exposure correction values provided by scanning a grey card test print. Edge enhancement filters which compensate for the additional MTF loss from the "cascaded" photographic stages can also be used.

While there has been shown what is considered to be the preferred embodiment of the invention, it will be manifest that many changes and modifications may be made therein without departing from the essential spirit of the invention. It is intended, therefore, in the annexed claims, to cover all such changes and modifications as may fall within the true scope of the invention.

We claim:

1. A method for converting first generation images obtained from original scenes to digital images through a formed transform to an image data metric comprising the steps of:
    (a) photographing a first generation image onto photographic film to produce a second generation image;
    (b) scanning the photographic film with a scanner to form a second generation scanned image; and
    (c) transforming the second generation scanned image to an image data metric which is independent of the source of the second generation image.

2. The method according to claim 1 wherein the transformation to the image data metric is calibrated by the steps of:
    (i) producing first generation image calibration targets from exposure patterns which sample the exposure range of the original scene;
    (ii) photographing the first generation image calibration targets onto film;
    (iii) scanning the film to produce scanned data values; and
    (iv) relating the scanned data values to the data metric.

3. The method according to claim 1 wherein the scanner is also used to scan a first generation image obtained from original scene to form a first generation scanned image and further comprising the step of:
(i) transforming the first generation scanned image into said image data metric independent of the source of the first generation image.

4. The method according to claim 3 further including the step of performing edge-enhancement, wherein the amount of edge-enhancement is altered when scanning photographic film exposed from first generation images.

5. The method according to claim 3 further including the step of color balancing, wherein a scene color balance algorithm is altered when scanning photographic film exposed from first generation images.

6. The method according to claim 5 further comprising the step of:
(i) photographing a greycard onto the second generation image that is used for setting the color balance of the second generation scanned image.

7. The method according to claim 1 further comprising the step of:
(i) recording on said photographic film an indicator describing the type of first generation images which are being photographed in order to assist in choosing the appropriate transformation to be employed.

8. A method for transforming image data to form an image data metric for prints comprising the steps of:
A. generating a first negative film by exposing a film to test image data covering the useful exposure range of the photographic film that will be transformed to the to be formed image data metric;
B. producing a print from said first negative film;
C. generating a second negative film from the produced print of step B;
D. scanning said second negative film to provide scanned image data;
E. forming a transform from said scanned image data and said test image data; and
F. transforming image data through said formed transform to form an image data metric.

9. A method for converting, through a transform, the images captured on a print or slide film into digital signals that form an image data metric comprising the steps of:
a. forming test images, as an array of color patches taken at reference exposure levels that represent the exposure range of the film used to create the print or the slide;
b. forming a print of the test images, if the test images represent a print and a negative of the test images if the test images represent a slide;
c. if a print was formed in step b, form a negative of that print;
d. converting the images formed in the negatives of steps b and c to digital signals; and
e. forming a transform relating the digital signals of step d to the reference exposure levels through which captured images are passed to form an image data metric.

10. The method according to claim 9 wherein the print or slide is in color.

11. A system for converting first generation print images obtained from original scenes to digital images through a formed transform comprising:
means for generating signals representing a plurality of reference exposure levels;
means responsive to said generated signals for exposing negative film with said reference exposure levels to form a test strip;
means for producing a print of the test strip and a second negative film from the print;
means for scanning the second negative film to provide digital signals indicative of the test strip;
means for producing second generation scanned images from the first generation print images; and
means for forming a transform using the provided digital signals and the generated signals through which second generation scanned images are passed to form an image data metric.

* * * * *